(12) United States Patent
Marley et al.

(10) Patent No.: US 7,107,799 B1
(45) Date of Patent: Sep. 19, 2006

(54) BALL HITCH LOCKING DEVICE

(76) Inventors: Kenneth Ray Marley, 429 Claremont, Norman, OK (US) 73069; Stanley N. Solloway, 4409 Briarcrest, Norman, OK (US) 73071

( * ) Notice: Subject to any disclaimer, the term of this patent is extended or adjusted under 35 U.S.C. 154(b) by 190 days.

(21) Appl. No.: 10/753,712

(22) Filed: Jan. 8, 2004

(51) Int. Cl.
*E05B 73/00* (2006.01)

(52) U.S. Cl. ...................... 70/14; 70/58; 70/34; 70/232; 70/416; 280/507

(58) Field of Classification Search .................... 70/14, 70/53–58, 232, 237, 258, 34, 416, 417; 280/507, 280/511; D12/162
See application file for complete search history.

(56) References Cited

U.S. PATENT DOCUMENTS

| | | | | |
|---|---|---|---|---|
| 3,391,555 | A | * | 7/1968 | Mamo .......................... 70/258 |
| 3,884,055 | A | * | 5/1975 | Vuillemot ...................... 70/58 |
| 4,141,569 | A | * | 2/1979 | Dilk ............................ 280/507 |
| 4,571,964 | A | | 2/1986 | Bratzler |
| 4,577,884 | A | * | 3/1986 | Harris ......................... 280/507 |
| 4,616,493 | A | * | 10/1986 | Fazzolari et al. ............. 70/129 |
| 4,730,841 | A | * | 3/1988 | Ponder ........................ 280/501 |
| 4,774,823 | A | | 10/1988 | Callison |
| 4,836,570 | A | * | 6/1989 | Lopez et al. ................. 280/507 |
| 5,222,755 | A | | 6/1993 | O'Neal |
| D388,383 | S | | 12/1997 | Foster |
| 5,775,139 | A | | 7/1998 | Sellers |
| 5,794,961 | A | * | 8/1998 | Niswanger ................... 280/507 |
| D419,122 | S | | 1/2000 | Stech |
| 6,019,337 | A | * | 2/2000 | Brown ..................... 248/354.5 |
| 6,070,441 | A | * | 6/2000 | Bernstrom ...................... 70/58 |
| D436,064 | S | | 1/2001 | Niswanger |
| 6,244,614 | B1 | | 6/2001 | Bonvillain |
| 6,427,496 | B1 | * | 8/2002 | Hurst ............................ 70/14 |
| 6,467,317 | B1 | | 10/2002 | Hillabush |
| 6,588,239 | B1 | * | 7/2003 | Johansson ...................... 70/14 |
| 6,598,432 | B1 | | 7/2003 | Dwyer |
| 6,722,686 | B1 | * | 4/2004 | Koy .......................... 280/507 |

* cited by examiner

*Primary Examiner*—Suzanne Dino Barrett (57) ABSTRACT

A trailer hitch locking device for securing a trailer having a ball type hitch includes a rigid U-shaped frame member having a central lower mounting member, an upper pin shield, a locking pin having a flattened locking end, a shaft and a pin head, the locking end engaging a cylindrical security lock which engages the locking pin through a hole in the frame member, the cylindrical security lock being surrounded by a lock security collar, preventing access to the entire cylindrical lock except for the outer surface of the cylindrical lock, exposed from the lock security collar, the pin head being sunken into a pin head recess in the frame member across from the lock security collar. The pin head access prevents access to the pin, the upper pin shield prevents access to the shaft of the pin and the cylindrical security lock and lock security collar preventing access to the locking end of the pin, the pin preventing removal of the device from the applied ball type hitch of the trailer.

3 Claims, 9 Drawing Sheets

BALL HITCH LOCKING DEVICE

CROSS REFERENCE TO RELATED APPLICATIONS

None

BACKGROUND OF THE INVENTION

1. Field of Invention

A trailer hitch locking device for securing a trailer having a ball type hitch includes a rigid U-shaped frame member having a central lower mounting member, an upper pin shield, a locking pin having a flattened locking end, a shaft and a pin head, the locking end engaging a cylindrical security lock which engages the locking pin through a hole in the frame member, the cylindrical security lock being surrounded by a lock security collar, preventing access to the entire cylindrical lock except for the outer surface of the cylindrical lock, exposed from the lock security collar, the pin head being sunken into a pin head recess in the frame member across from the lock security collar. The pin head access prevents access to the pin, the upper pin shield prevents access to the shaft of the pin and the cylindrical security lock and lock security collar preventing access to the locking end of the pin, the pin preventing removal of the device from the applied ball type hitch of the trailer.

2. Description of Prior Art

The following United States patents were discovered and are disclosed within this application for utility patent. All relate to trailer locking devices. In U.S. Pat. No. 6,467,317 to Hillabush, a locking device adapted to a lunette-style trailer is disclosed which includes a bottom member having a hardened tang with a central aperture, a top member having a slot through which the tang extends and a step in lock having a bolt, activated by a lock mechanism, which engages the aperture in the tang to attach the bottom member to the top member, the step in lock having a raised wall within which the step in lock is secured. The step in lock and the raised wall bear similarity to element of the present invention, but the remainder of the Hillabush device is distinctively different from the present invention.

U.S. Pat. No. D419,122 to Stech is adapted to a trailer hitch having a square ball locking mechanism. In U.S. Pat. No. 6,598,432 to Dwyer is a lock box is fitted over a trailer hitch, also having a central tang which is inserted within the ball receiving portion of a ball trailer hitch, as are U.S. Pat. No. 6,244,614 to Bonvillain, U.S. Pat. No. 5,775,139 to Sellers, U.S. Pat. No. 4,571,964 to Bratzler and D388,383 to Foster.

In U.S. Pat. No. 5,222,755 to O'Neal involves a rounded ball inserting into the ball type hitch, the ball connected to a chain, the chain further connected to a padlock which locks the chain to a hole in the spring loaded lever of the hitch, locking the ball within the ball-type hitch. In U.S. Pat. No. 4,774,823 to Callison, a simple ball attached to a mounting plate attached to the trailer hitch, serves dual purpose, first in blocking access to a ball type hitch socket, and second, locking a connection between a ball type hitch and a ball on a towing hitch when attached together. A universal trailer hitch is disclosed in U.S. Pat. No. D436,064 to Niswanger, discloses a U-shaped frame member, a central lower mounting member attached to the U-shaped member and a locking pin spanning the U-shaped member through a pair of aligned holes in the U-shaped member, the locking pin secured to the U-shaped member by a padlock, the locking pin securely retaining the Niswanger device on a ball type hitch.

SUMMARY OF THE INVENTION

Numerous trailer hitch locks have been included and disclosed in prior art, as indicated above. Trailer theft is obviously a problem which many inventors have tried to remedy, with some success. However, the majority of these previous theft deterrent locks have exposed crucial locking elements, including the padlocks, the locking pins and chains which hold the lock in place. These exposed items make removal of the locking devices easy targets for thieves due to the short amount of time it takes to bypass the locking device. If it took a greater amount of time and effort to remove the device, theft would be less likely to occur. Therefore, a locking device which protects these crucial elements involved in the locking means is necessary to further develop the security of a trailer hitch, specifically those having a trailer hitch ball, known in the industry as a bulldog hitch.

The primary objective of the present invention is to provide a trailer hitch locking device which protects the locking pin from access to a saw blade or cutting tool, protects the locking device from a bolt cutter and has no exposed parts other than the locking frame to make theft less likely and more time consuming.

A secondary objective of the invention is to provide the locking device in a manner which is easy to apply and remove with a simple turn of a key, making removal accomplished only by those having a key to operate the locking device.

DESCRIPTION OF THE DRAWINGS

The following drawings are submitted with this utility patent application.

DESCRIPTION OF THE PREFERRED EMBODIMENT

Figure 1:
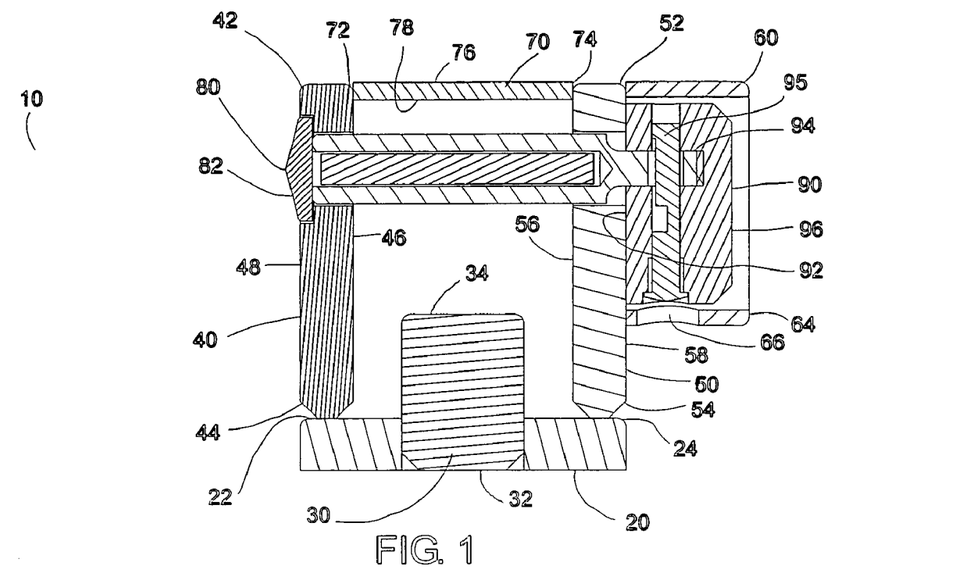
FIG. 1 is a front cross section of the device in a locked and engaged embodiment.
Figure 2:
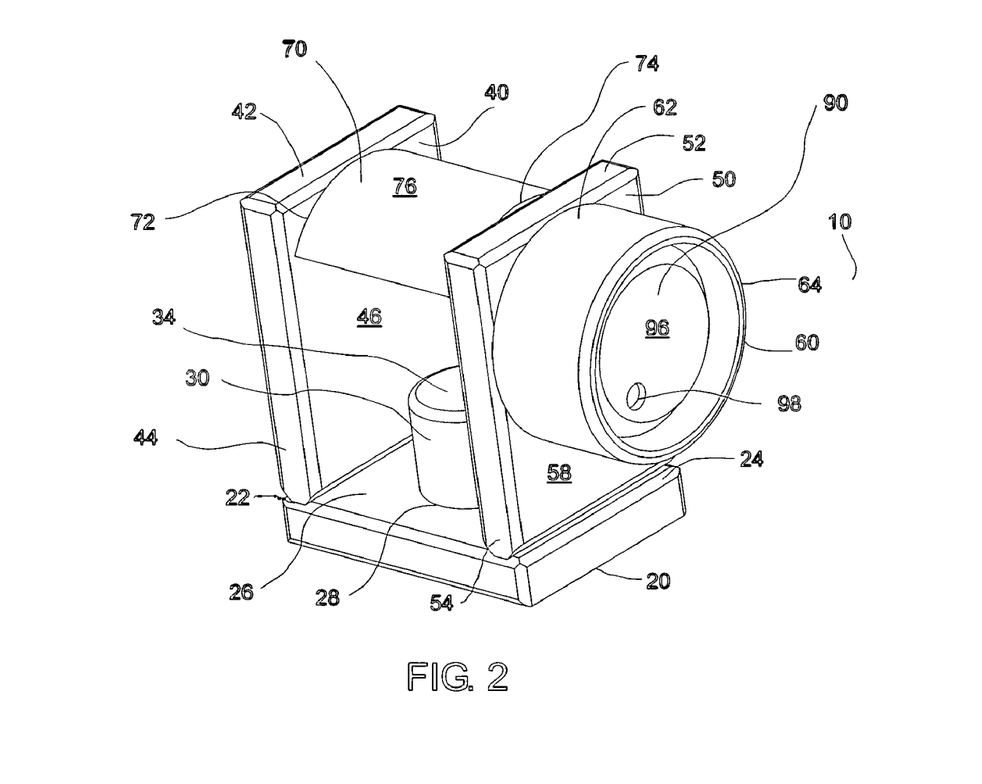
FIG. 2 is an upper front perspective view of the device
Figure 3:
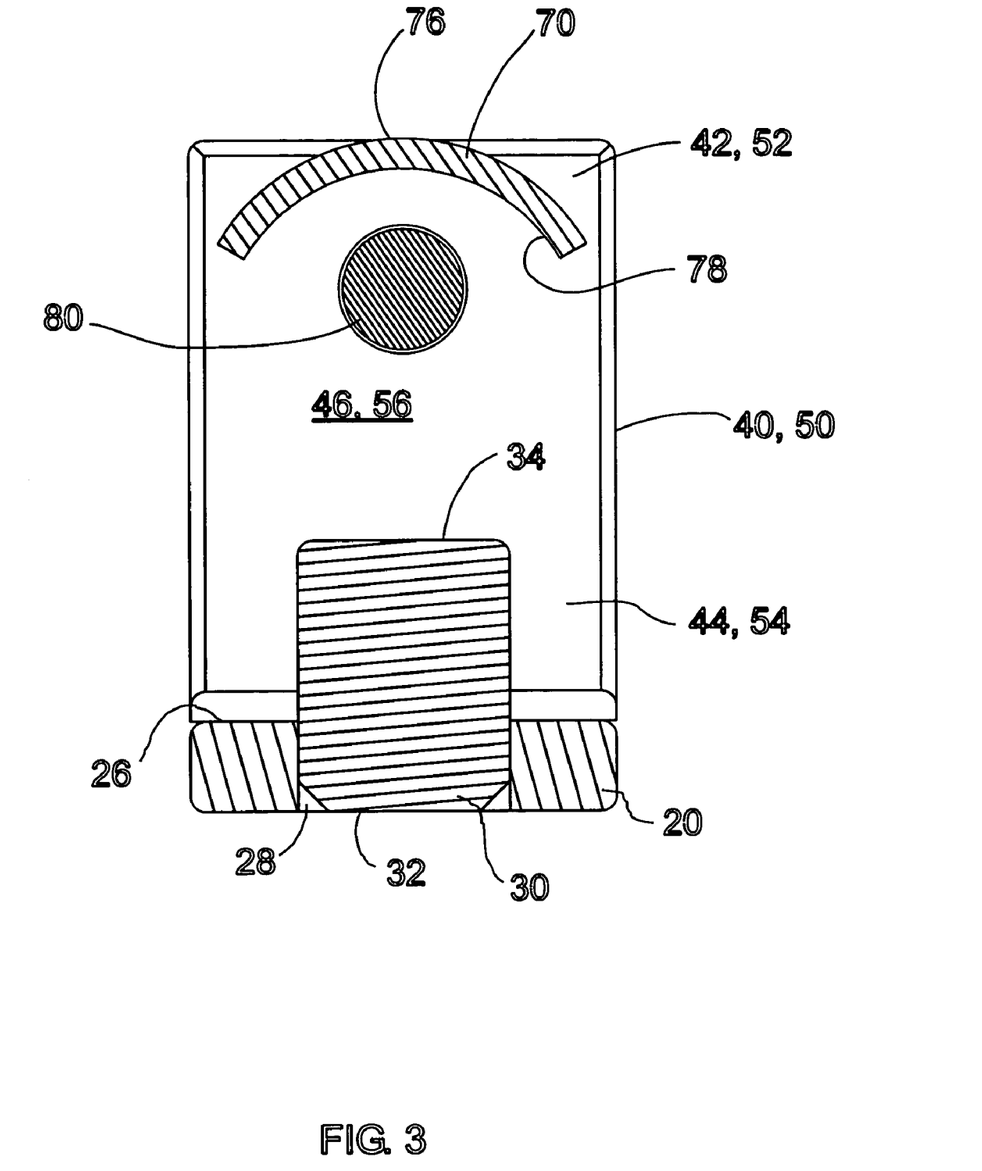
FIG. 3 is a side cross section of the device with the locking pin in a locked position.
Figure 4:
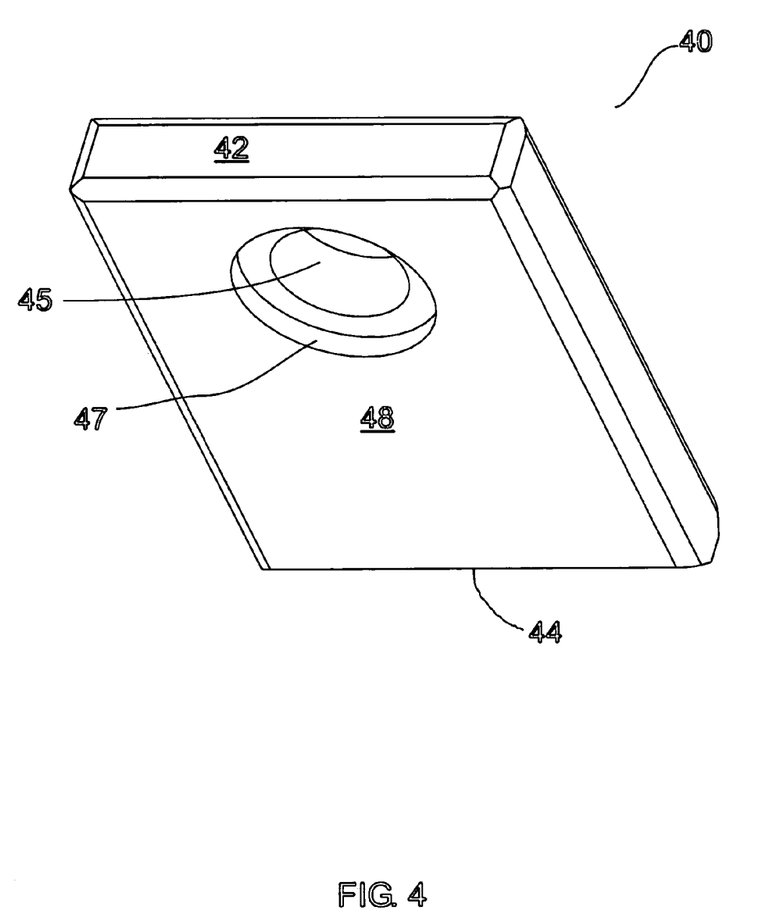
FIG. 4 is an outer perspective view of the first side plate.
Figure 5:
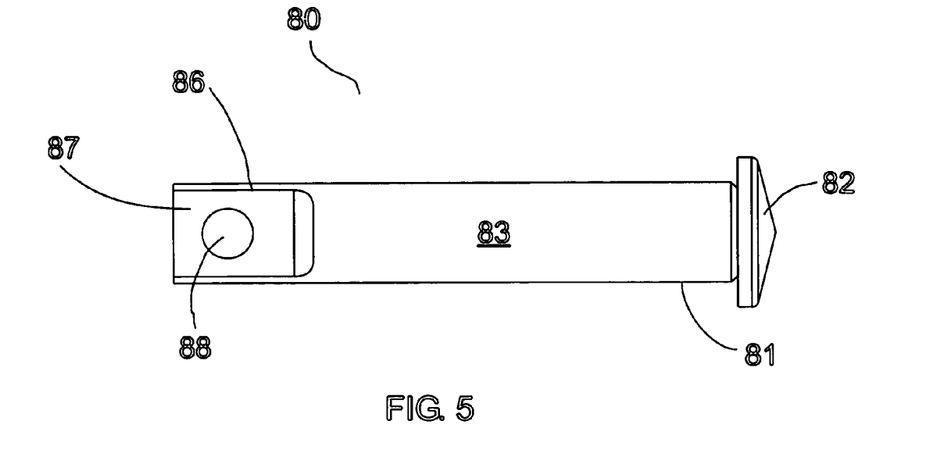
FIG. 5 is a side view of the locking pin.
Figure 6:
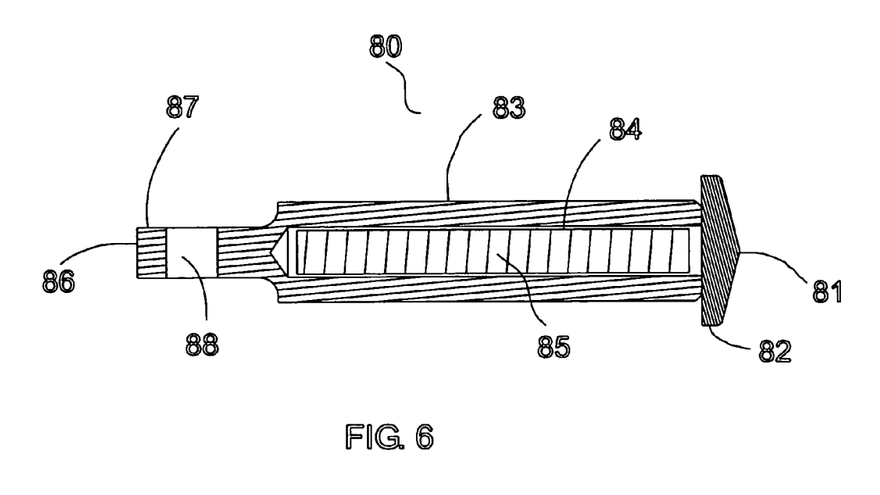
FIG. 6 is a side cross section of a preferred embodiment of the locking pin, indicating an inner cavity with a central security roller within the inner cavity.
Figure 7:
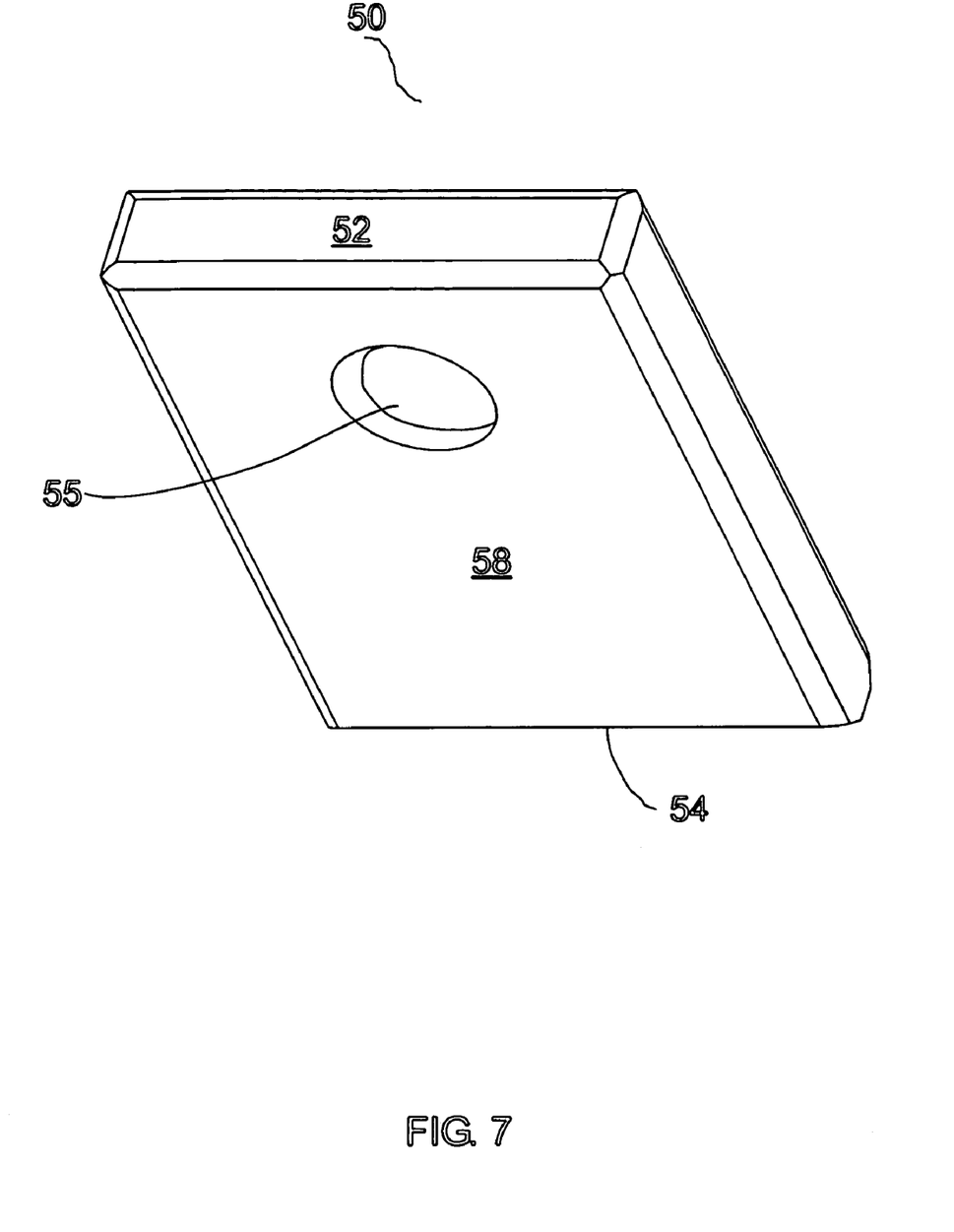
FIG. 7 is an outer perspective view of the second side plate.
Figure 8:
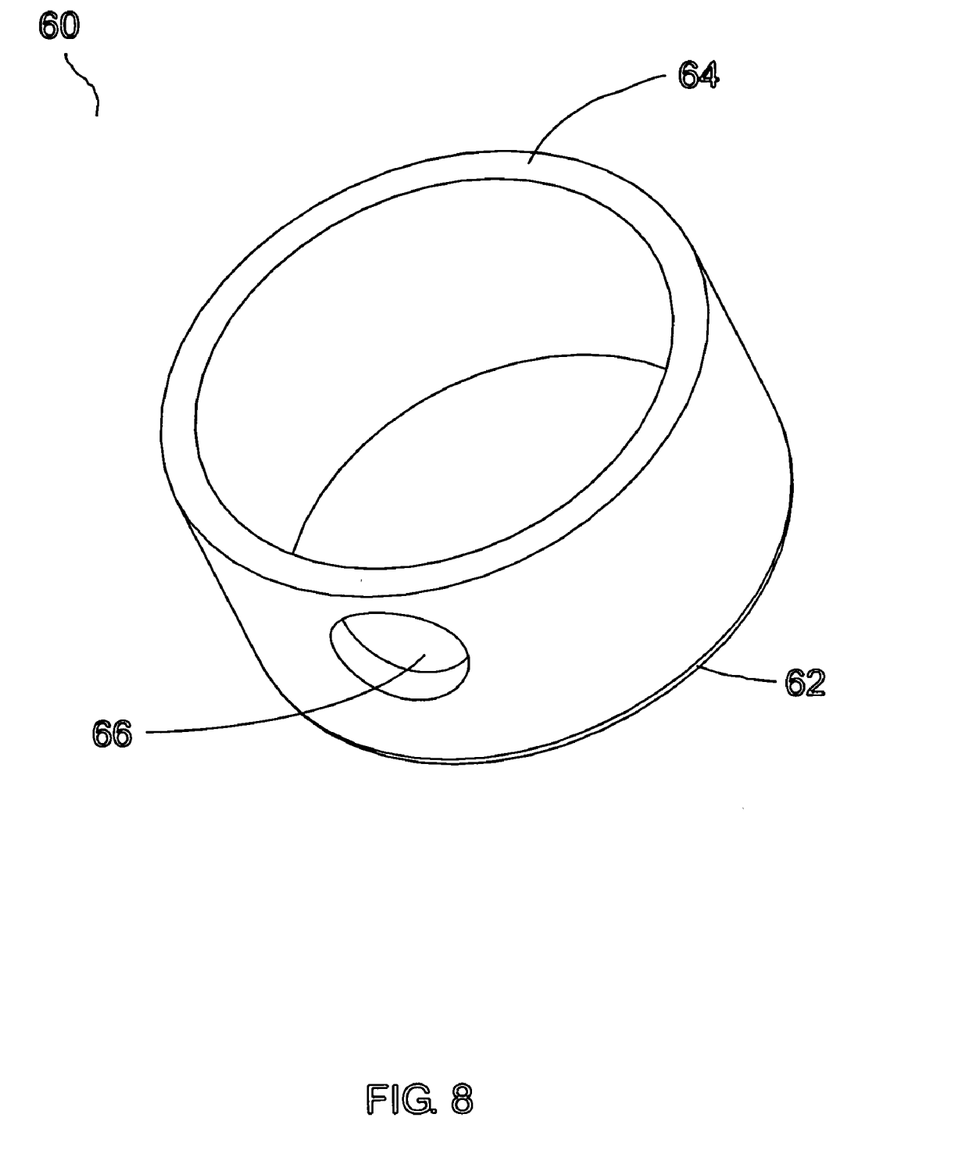
FIG. 8 is a perspective view of the lock security collar.
Figure 9:
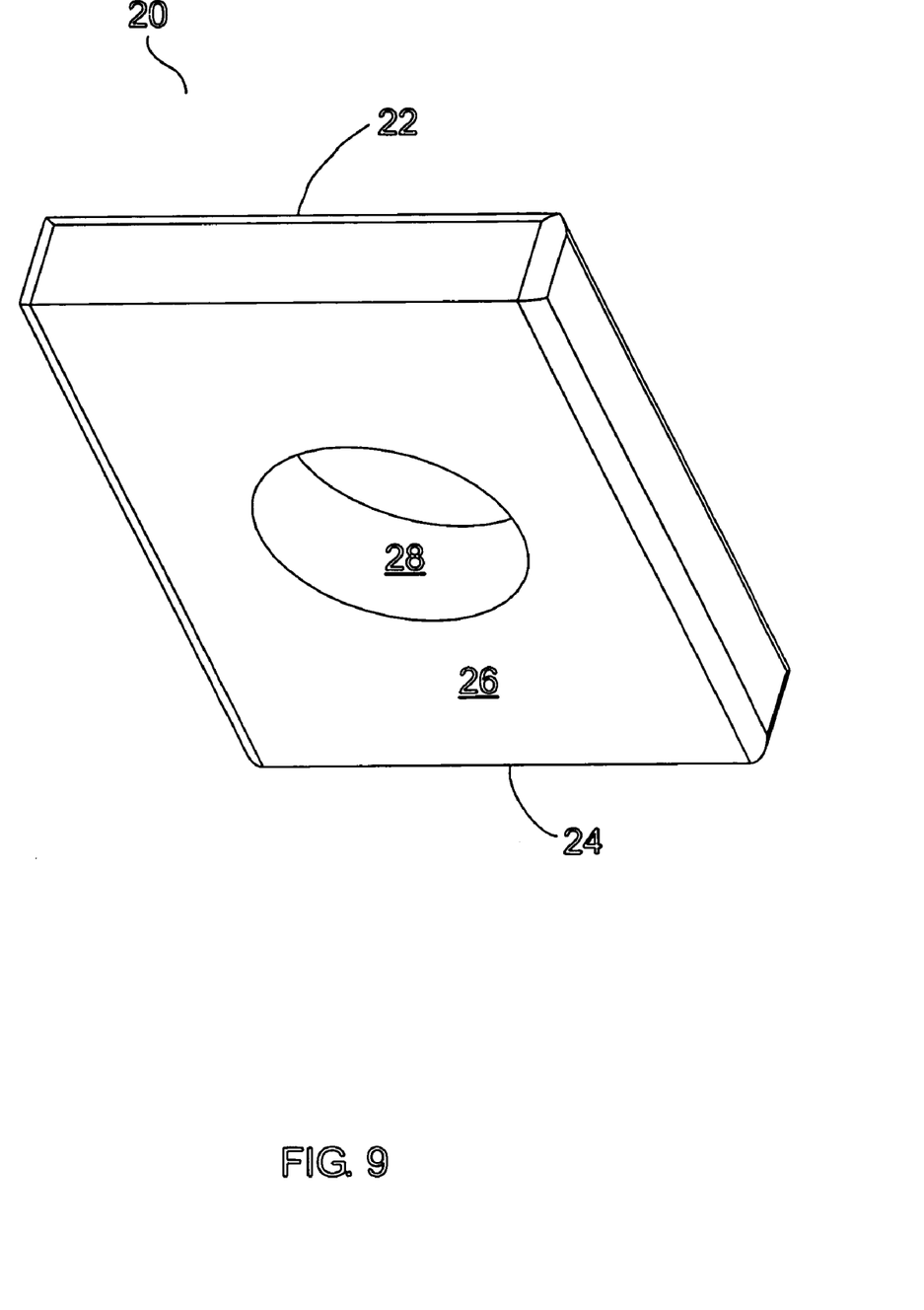
FIG. 9 is a perspective view of the base plate of the device.
Figure 10:
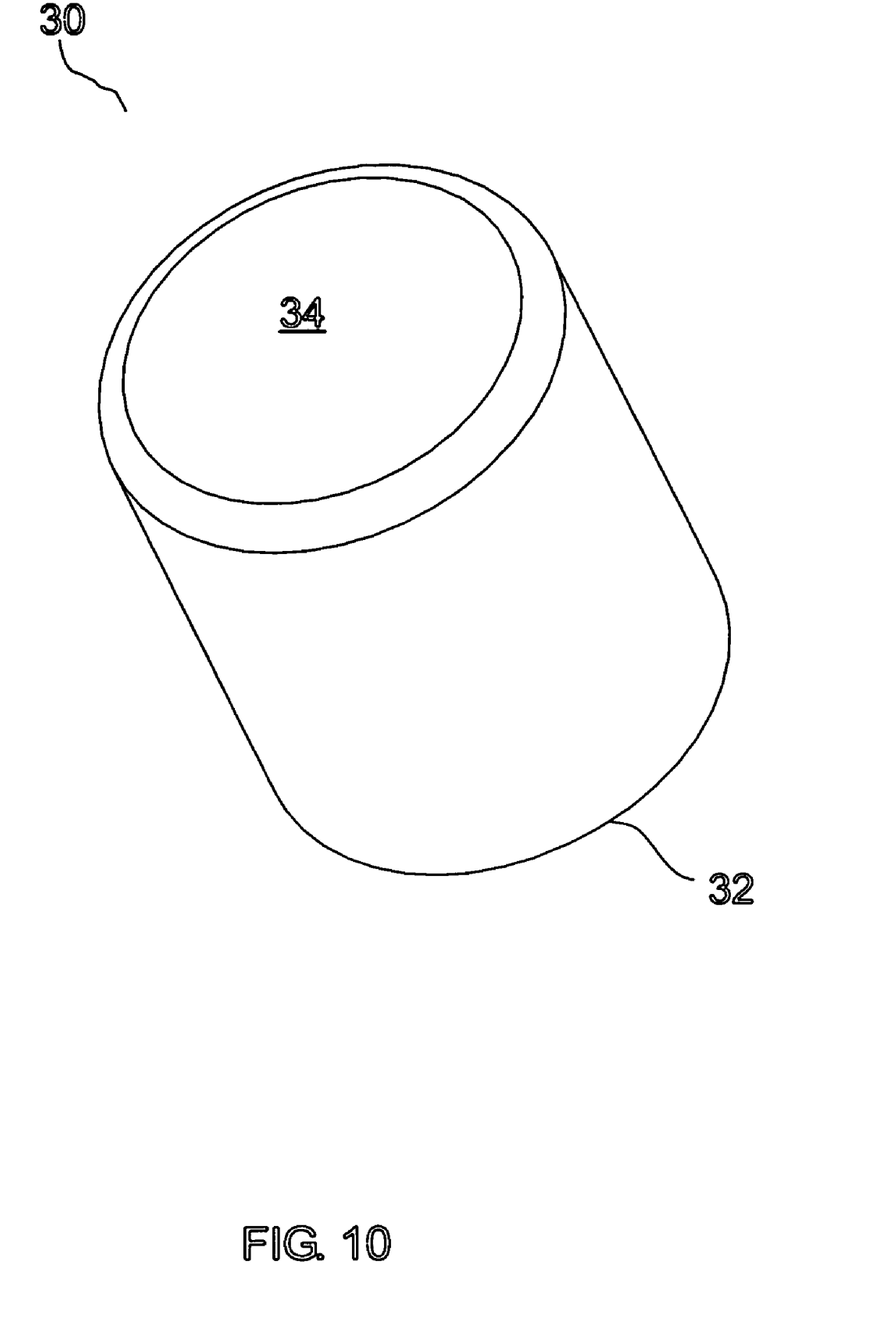
FIG. 10 is a perspective view of the central lower mounting pin.
Figure 11:
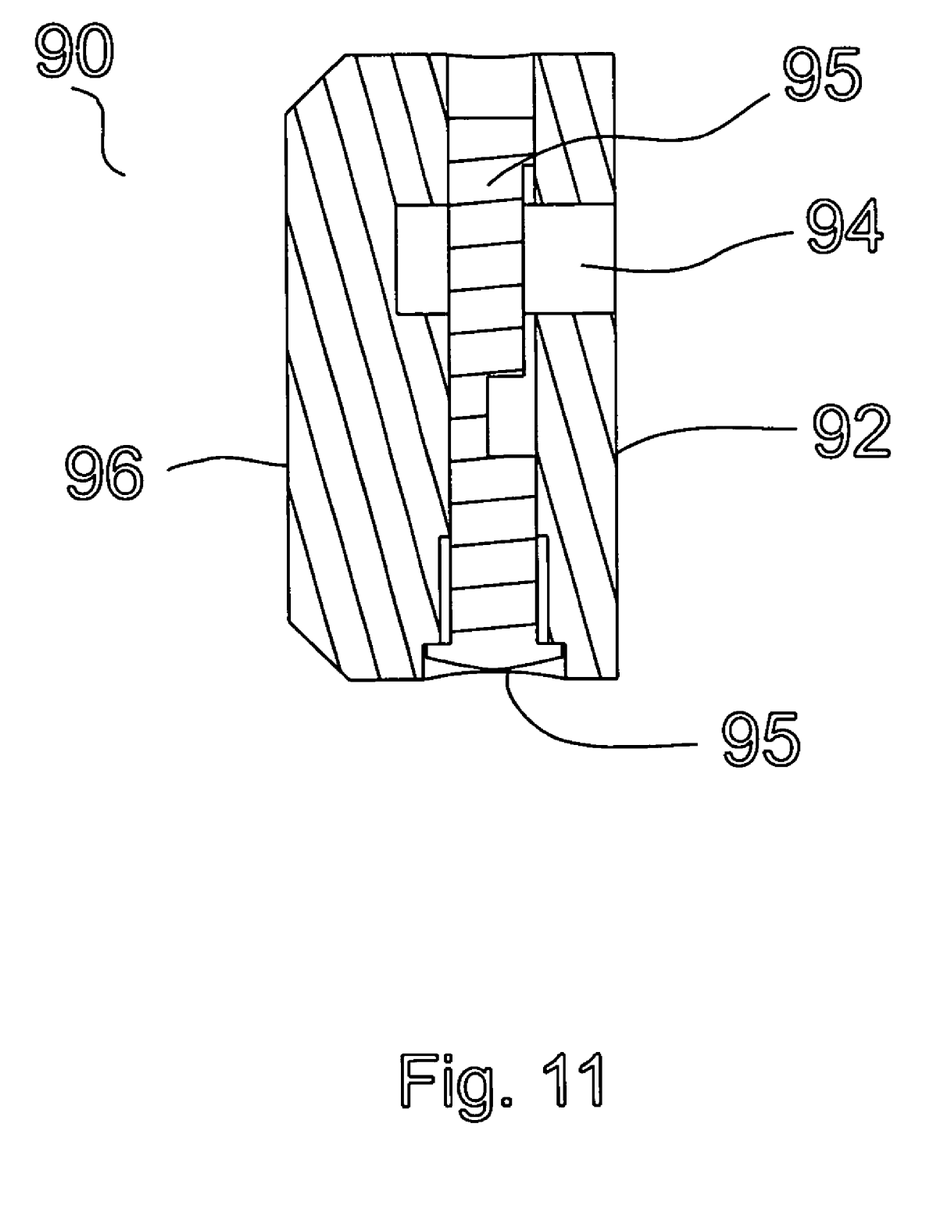
FIG. 11 is a side cross section of the cylindrical lock.

A ball hitch locking device 10, shown in FIGS. 1–11 of the drawings, for application to a ball-type trailer hitch having a receiver cavity for a trailer hitch ball, comprises a base member 20, FIG. 9, having an upper surface 26, a central portion 28, a first side margin 22 and a second side margin 24, the central portion 28 having an attached central mounting pedestal 30, FIG. 10, with an upper end 34 and a lower end 32 welded to the upper surface 26 around the central portion 28, a first side plate 40, FIG. 4, having a pin hole 45 with a recessed margin 47 in an outer surface 48, the first side plate 40 attached to the first side margin 22 of the base member 20, a second side plate 50, FIG. 7, having a pin hole 55 attached to the second side margin 24 of the base member 20, a cylindrical lock collar 60, FIG. 8, attaching to an outer surface 58 of the second side plate 50 around the pin hole 55, an upper pin shield 70, FIGS. 1–3, attached between an inner surface 46 of an upper end 42 of the first side plate 40 and an inner surface 56 of an upper end 52 of the second side plate 50 forming an arch over the pin hole 45 of the first side plate 40 and the pin hole 55 of the second side plate 50, a lock pin 80, FIGS. 5–6, having a pin head 82 on a first end 81, a shaft 83 and a second end 86 having a flattened locking tang 87 with an aperture 88, the locking pin 80 inserted through the pin hole 45 in the first side plate 40 and through the pin hole 55 of the second side plate 50, the tang 87 and aperture 88 extending beyond the outer surface 58 of the second side plate 50 into the cylindrical locking collar 60, with a keyed cylindrical lock 90, FIGS. 1–2 and 11 securing to the tang 87 and aperture 88, the cylindrical lock 90 being closely surrounded by the cylindrical lock collar 60.

In a preferred embodiment, the cylindrical lock 90 is an AMERICAN LOCK® 2500 Series Padlock, or other comparable cylindrical lock chosen because it has no exposed locking pins or required hasps which makes removal with a bolt cutter possible. This type lock, shown in FIGS. 1–2 and 11, includes an inner surface 92 having a pin lock receiver 94, an outer surface 96 including a keyed lock 98, and an inner lock peg 95 which engages the aperture 88 of the tang 87 in the lock pin 80, securing the lock pin 80 within the cylindrical lock 90. When the lock pin 80 is locked into the cylindrical lock 90, the pin head 82 should be securely and completely within the recessed margin 47 in the outer surface 48 of the first side plate 40, exposing no portion of the shaft 83 of the lock pin 80. The cylindrical lock collar 60 would further include an inner perimeter 62 attached to the outer surface 58 of the second side plate 50, an outer edge 64 and a lock peg hole 66 which would allow the lock peg 95 of the cylindrical lock 90 to extend through the cylindrical lock collar 60 when the cylindrical lock 90 is disengaged.

The upper pin shield 70 further comprises a first end 72 attaching to the first side plate 40, a second end 74 attached to the second side plate 50, an upper surface 76 arching upward from the base member 20 and a lower surface 78 directed towards the base member 20, but also arching in an upward direction. By preference, the lock pin 80, when engaged, would be seen slightly below the upper pin shield 70 in a horizontal plane, but not entirely, as indicated in FIG. 3.

The attachment between the a lower end 44 of the first side plate 40 to the first side margin 22 of the base member 20, the lower end 32 of the central mounting pedestal 30 to the central portion 28 of the base member 20 and a lower end 54 of the second side plate 50 to the second side margin 24 of the base member 20 would be by welding, as would the attachment of the first end 72 of the upper pin shield 70 to the inner surface 46 of the upper end 42 of the first side plate 40, the second end 74 of the upper pin shield 70 to the inner surface 56 of the upper end 52 of the second side plate 50, and the inner perimeter 62 of the cylindrical lock collar 60 to the outer surface 58 of the second side plate 50. The aligned pin hole 45 of the first side plate 40 and pin hole 55 of the second side plate 50 would be positioned within the respective side plates 40, 50 to allow the lock pin 80 to be applied through the pin holes 45, 55 when the central mounting pedestal 30 is inserted within the receiver cavity of the ball-type trailer hitch, with the lock pin 80 preventing disengagement of the central mounting pedestal 30 from the receiver cavity of the ball-type trailer hitch once the lock pin 80 is inserted through the aligned pin holes 45, 55 and locked.

Alternatively, the lock pin 80 may be provided in a enhanced theft deterrent embodiment, specifically FIG. 6, the lock pin 80 having a longitudinal cavity 84 within the shaft 83 containing a roll pin 85 to prevent a complete penetration of the shaft 83 of the lock pin 80 by a saw blade, in the event the upper pin shield 70 is penetrated or removed. This roll pin 85, when contact is made by a saw blade after partial severance of the shaft 83 is made by a saw blade, rolls with the motion of the saw blade and is not penetrated by the saw blade, in effect, preventing further penetration of the shaft 83 of the lock pin 80.

The entire ball hitch locking device 10 is made of a hardened steel, which may be, in whole or in part, stainless steel, brass, or a cold roll steel, with exception of the cylindrical lock, which is generally made to specifications of the manufacture from which it is purchase, most often provided in stainless steel or a chrome plated hardened steel. It is also contemplated within the scope of this invention, that if compatible locks are available in some shape other than cylindrical, they could be utilized, with modification made to the lock collar conforming closely to the shape of the alternative lock.

While the invention has been particularly shown and described with reference to a preferred embodiment thereof, it will be understood by those skilled in the art that changes in form and detail may be made therein without departing from the spirit and scope of the invention.

What is claimed is:

1. A ball hitch locking device adapted to a ball-type trailer hitch having a receiver cavity for a trailer hitch ball, comprises:
   a base member having an upper surface, a central portion, a first side margin and a second side margin;
   a central mounting pedestal attached to said central portion, said central mounting pedestal having an upper end and a lower end welded to said upper surface around said central portion;

a first side plate having a pin hole with a recessed margin in an outer surface of said first side plate, said first side plate attached to said first side margin of said base member;

a second side plate having a pin hole attached to said second side margin of said base member;

a cylindrical lock collar attaching to an outer surface of said second side plate around said pin hole;

an upper pin shield attached to an inner surface of an upper end of said first side plate and an inner surface of an upper end of said second side plate forming an arch over said pin hole of said first side plate and said pin hole of said second side plate;

a lock pin having a pin head on a first end, a shaft and a second end having a flattened locking tang with an aperture, said locking pin inserted through said pin hole in said first side plate and through said pin hole of said second side plate, said tang and aperture extending beyond said outer surface of said second side plate into said cylindrical locking collar; and a keyed cylindrical lock securing to said tang and aperture, said cylindrical lock being closely surrounded by said cylindrical lock collar.

2. The device, as disclosed in claim 1, said upper pin shield further comprising:

a first end attached to said first side plate, a second end attached to said second side plate, an upper surface arching upward from said base member and a lower surface directed towards said base member, said lower surface also arching in an upward direction, wherein said lock pin, when engaged, would be partially visible below said upper pin shield in a horizontal plane.

3. The device as disclosed in claim 1, wherein said locking pin further comprises:

a longitudinal cavity within said shaft containing a roll pin to prevent a complete penetration of said shaft of said lock pin if attempt is made to cut said shaft, and in the event said upper pin shield is penetrated or removed, said roll pin rolling within said longitudinal cavity not allowing penetration during such cutting attempt of said shaft.

* * * * *